United States Patent
Abdulhayoglu et al.

(10) Patent No.: US 11,314,870 B1
(45) Date of Patent: *Apr. 26, 2022

(54) AUTO-CONTAINMENT OF POTENTIALLY VULNERABLE APPLICATIONS

(71) Applicants: Melih Abdulhayoglu, Montclair, NJ (US); Ilker Simsir, Woodland Park, NJ (US)

(72) Inventors: Melih Abdulhayoglu, Montclair, NJ (US); Ilker Simsir, Woodland Park, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/920,411

(22) Filed: Mar. 13, 2018

Related U.S. Application Data

(60) Provisional application No. 62/471,244, filed on Mar. 14, 2017.

(51) Int. Cl.
  *G06F 21/57* (2013.01)
  *G06F 21/51* (2013.01)
  (Continued)

(52) U.S. Cl.
  CPC ............ *G06F 21/577* (2013.01); *G06F 21/51* (2013.01); *G06F 21/53* (2013.01); *G06F 8/65* (2013.01);
  (Continued)

(58) Field of Classification Search
  CPC ......... G06F 21/00; G06F 21/53; G06F 11/00; G06F 21/577; G06F 21/51; G06F 9/455; G06F 2221/033; G06F 8/65; H04L 63/1458; H04L 63/464; H04L 63/102; H04L 63/1408; H04L 63/1425;
  (Continued)

(56) References Cited

U.S. PATENT DOCUMENTS

| 7,694,328 B2 | 4/2010 | Joshi et al. |
| 7,793,338 B1 | 9/2010 | Beddoe et al. |

(Continued)

FOREIGN PATENT DOCUMENTS

| EP | 2750069 A1 | 7/2014 |
| WO | 2018008024 A1 | 1/2018 |

OTHER PUBLICATIONS

Thomas Blasing, Leonid Batyuk, Aubrey-Derrick Schmidt, Seyit Ahmet Camtepe, Sahin Albayrak An Android Application Sandbox system for suspicious software detection Malicious and Unwanted Software (MALWARE), 2010 5th International Conference Oct. 19-20, 2010.

(Continued)

*Primary Examiner* — Chau Le
*Assistant Examiner* — Andrew Suh
(74) *Attorney, Agent, or Firm* — Joseph P. Aiena

(57) ABSTRACT

There is provided a method and system for an advanced endpoint protection. With this methodology, when a file is requested to be executed on any endpoint, all intelligence sources would be checked to decide if that file has any known or potential vulnerability associated with it. If there is any information about any known or potential vulnerability, it would be launched inside the secure container to isolate the all resource usage of that application from the rest of the known good and secure applications in order to achieve the secure computing environment on an endpoint.

3 Claims, 7 Drawing Sheets

(51) Int. Cl.
*G06F 21/53* (2013.01)
*G06F 9/455* (2018.01)
*G06F 8/65* (2018.01)

(52) U.S. Cl.
CPC ........ *G06F 9/455* (2013.01); *G06F 2221/033* (2013.01)

(58) Field of Classification Search
CPC ....... H04L 9/0662; H04L 63/34; H04L 63/14; H04L 63/1416; H04L 63/1441; H04L 63/30; H04L 65/1079; H04L 12/64; H04L 2463/145; H04L 43/0829; H04L 43/0852; H04L 43/0894; H04L 43/16; H04L 45/24; H04L 63/0209; H04L 63/0281; H04L 63/101; H04L 63/1466; H04L 67/322; H04L 69/14; H04L 12/28; H04L 2463/141; H04L 47/32; H04L 63/0236; H04L 63/0263; H04L 63/029; H04L 63/0428; H04L 63/18; H04L 63/20; H04L 65/102; H04L 65/1069; H04L 69/22
See application file for complete search history.

(56) References Cited

U.S. PATENT DOCUMENTS

| | | | |
|---|---|---|---|
| 8,090,797 B2 | 1/2012 | Chinta et al. | |
| 9,274,974 B1* | 3/2016 | Chen | G06F 12/109 |
| 9,438,618 B1* | 9/2016 | Sultan | H04L 63/1433 |
| 2003/0014466 A1* | 1/2003 | Berger | G06F 9/468 |
| | | | 718/102 |
| 2006/0021029 A1* | 1/2006 | Brickell | G06F 21/51 |
| | | | 726/22 |
| 2007/0208822 A1* | 9/2007 | Wang | G06F 16/9566 |
| | | | 709/217 |
| 2008/0016339 A1* | 1/2008 | Shukla | G06F 21/566 |
| | | | 713/164 |
| 2009/0265756 A1 | 10/2009 | Zhang et al. | |
| 2011/0145926 A1* | 6/2011 | Dalcher | G06F 11/3466 |
| | | | 726/26 |
| 2011/0296487 A1 | 12/2011 | Walsh | |
| 2012/0017213 A1* | 1/2012 | Hunt | G06F 21/53 |
| | | | 718/100 |
| 2012/0066759 A1 | 3/2012 | Chen et al. | |
| 2012/0110337 A1* | 5/2012 | Murphey | G06F 21/10 |
| | | | 713/182 |
| 2012/0216285 A1* | 8/2012 | Walsh | G06F 21/53 |
| | | | 726/26 |
| 2015/0047046 A1* | 2/2015 | Pavlyushchik | H04L 63/1433 |
| | | | 726/25 |

OTHER PUBLICATIONS

Bryan D.Payne, Martim Carbone, Monirul Sharif, Wenke Lee Lares: An Architecture for Secure Active Monitoring Using Virtualization Security and Privacy, 2008. SP 2008. IEEE Symposium May 18-22, 2008; Publisher: IEEE Conference Location: Oakland, CA, USA.

* cited by examiner

AUTO-CONTAINMENT OF POTENTIALLY VULNERABLE APPLICATIONS

BACKGROUND

In today's protection environment almost all endpoint security solutions build lists of either good applications or bad applications, and sometimes both. These lists could contain definitive file identifiers to match exact fingerprint of a file or contain generic signatures which might be checked during run-time to match with a file. If there is a match on good list or bad list, endpoint security products would threat the file based on their good/bad file rule set. While bad files are most probably deleted or quarantined, good files (or most of the time just all of the remaining "not bad files") would be run on the endpoint with unlimited access.

However, today's attack vectors show that malwares or hackers are able to exploit the vulnerabilities on known good applications to distribute their malwares or cause direct harm on endpoints. This shows that permanent trust to certain files (even if it is tested and distributed by trusted companies) might fail and might lead to infections.

One of the old methods of protection from the threat vectors is to watch the activities of all known good applications (A group) and try to identify if any abnormal behavior is shown by those. If any abnormality is detected, either the behavior would be stopped or the file execution in total would be stopped. Another method is watching the core system parameters against any threat and stop any application from accessing/changing those parameters that these applications are not intended to (B group). Other approaches (C group) try to detect another sign by other layers later on the kill chain for the same attack vectors.

However, these approaches are ineffective since security solution should monitor the activities of all applications to be able to assess the behavior which is very resource intensive (A group). Additionally, security solutions should know the normal behavior to be able to identify the abnormal behavior and also not to block the user's productivity by acting prematurely on any change of the behavior with the assumption of abnormality (false positives) (A group). Disadvantages for the B group of methods are the following. Security solution should always monitor the system resources against all applications access and change attempts, which is very resource intensive. Also security solutions should know the normal behavior and access rights of applications to be able to grant the access or change attempts of applications over core system parameters. They shouldn't block the legitimate operations (user's productivity) by acting prematurely (false positives). But only watching core system resources/parameters might be not enough to protect from all kinds of threat vectors. As an example, a cryptolocker sample can just act on user generated files without touching the systems core and successfully launch the attack without generating any indicators. C group solutions depend on detection of these attacks on later stages of kill chain via another security layer. However, there is no guarantee that attacks will be detected and it weakens the layered approach to security.

Thus, there is a need in new system and method for advanced endpoint protection solution.

SUMMARY OF INVENTION

The current invention is a method and system for providing additional security on endpoints. It presents complementary feature basically containing the additional trusted applications (executable files) automatically if those applications have a known vulnerability or a patch which might be indicator of potential vulnerability.

Invention checks if a trusted file has any known vulnerability or an applicable patch. If any of these conditions are met, file should be run inside secure container automatically to isolate the execution of file from other system applications and protect the computer if any infections occur. Sandbox means an isolation framework which prepares separation of file system and operating system registry for the applications which are jailed to sandbox. It's a type of software virtualization which is used to protect good and known applications from unwanted changes made by unknown applications. Thus, all the changes which are made by sandboxed application on file system and registry are not reflected to common file system and registry, but kept isolated in sandbox and are visible only for the applications inside the sandbox.

Since invention method concentrates on specific applications for specific duration which are known to have a vulnerability or have a potential vulnerability, the computer resources would be spent only for a subset of applications versus all applications on other methodologies.

Protection with this methodology would not depend on the detection capability (which never can be perfect in practice) but would be permanent due to containment technology.

Also, end users would be able to keep interacting with the files as usual inside the container as long as they need to and that will not decrease the productivity, whereas old methodologies might block the execution at any level if there is a detection or false positive.

Vulnerabilities of applications' productivity keep the security industry busy for a very long time. There are still point solution companies emerging everyday to address these concerns from a different angle. Invention method is the only solution that can address the productivity and security needs of end users at once.

DETAILED DESCRIPTION

The present invention discloses method and system for advanced endpoint protection.

Figure 1:
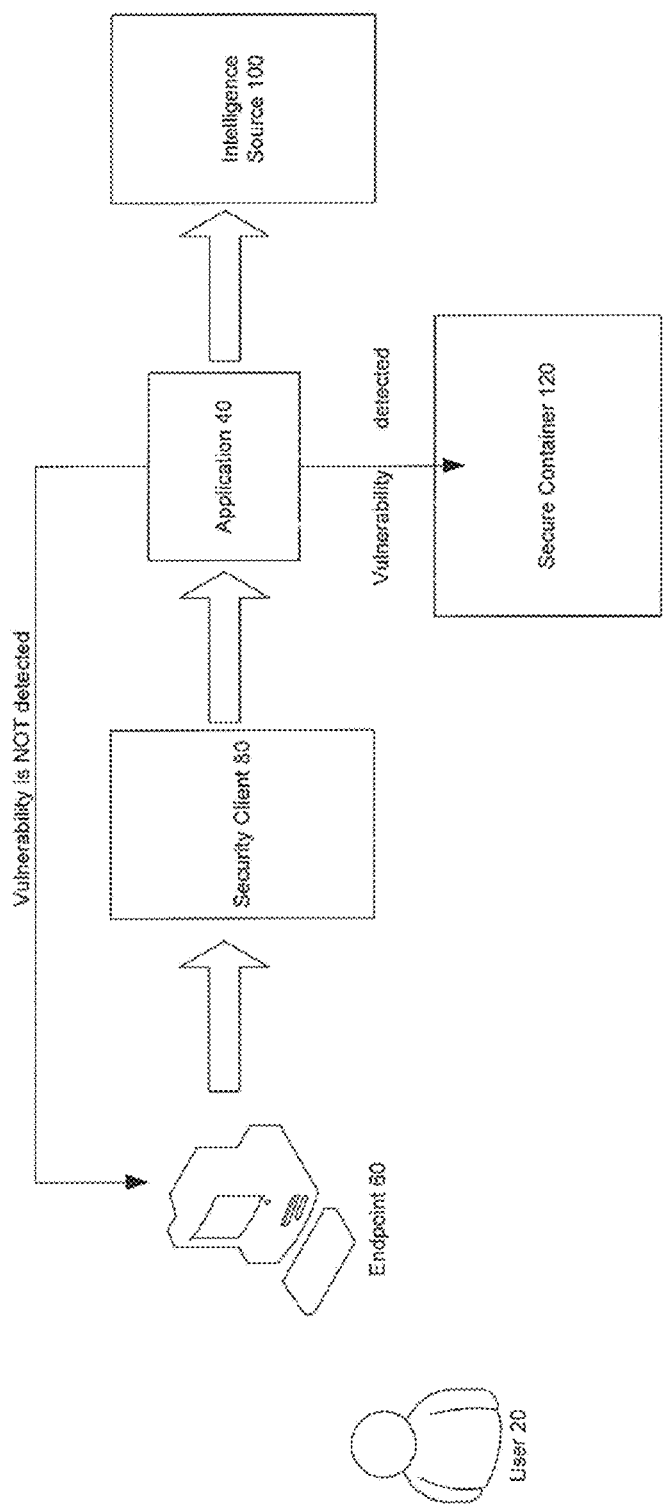
FIG. 1 is a depiction of general scheme of the invention.

FIG. 1 shows depiction of general scheme of the invention. There is a user 20 that requests the execution of application 40 on any endpoint 60. Before application 40 is launched its rating is checked by security client 80 to decide if that application 40 has any known or potential vulnerability associated with it. Also security client 80 checks intelligence source 100. In case of finding any vulnerabilities of application 40 security client 80 creates secure container 120 to isolate all resource usage of that application 40 from the rest of the known good and secure applications.

Figure 2A:
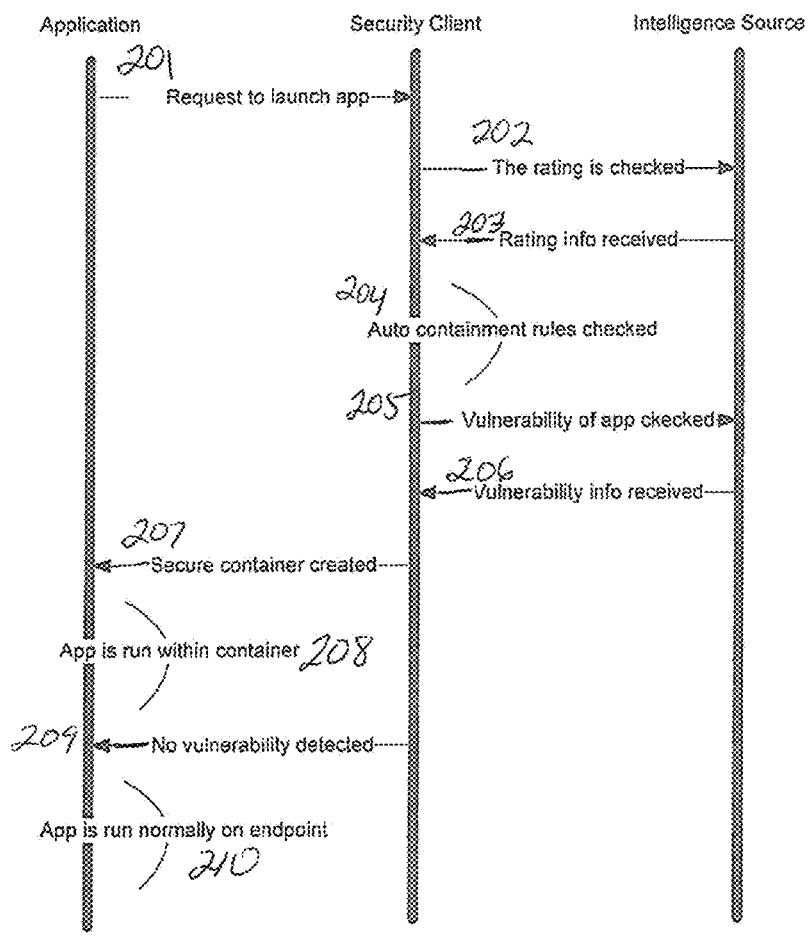
FIG. 2A is a diagram presenting the process of the invention.
Figure 2B:
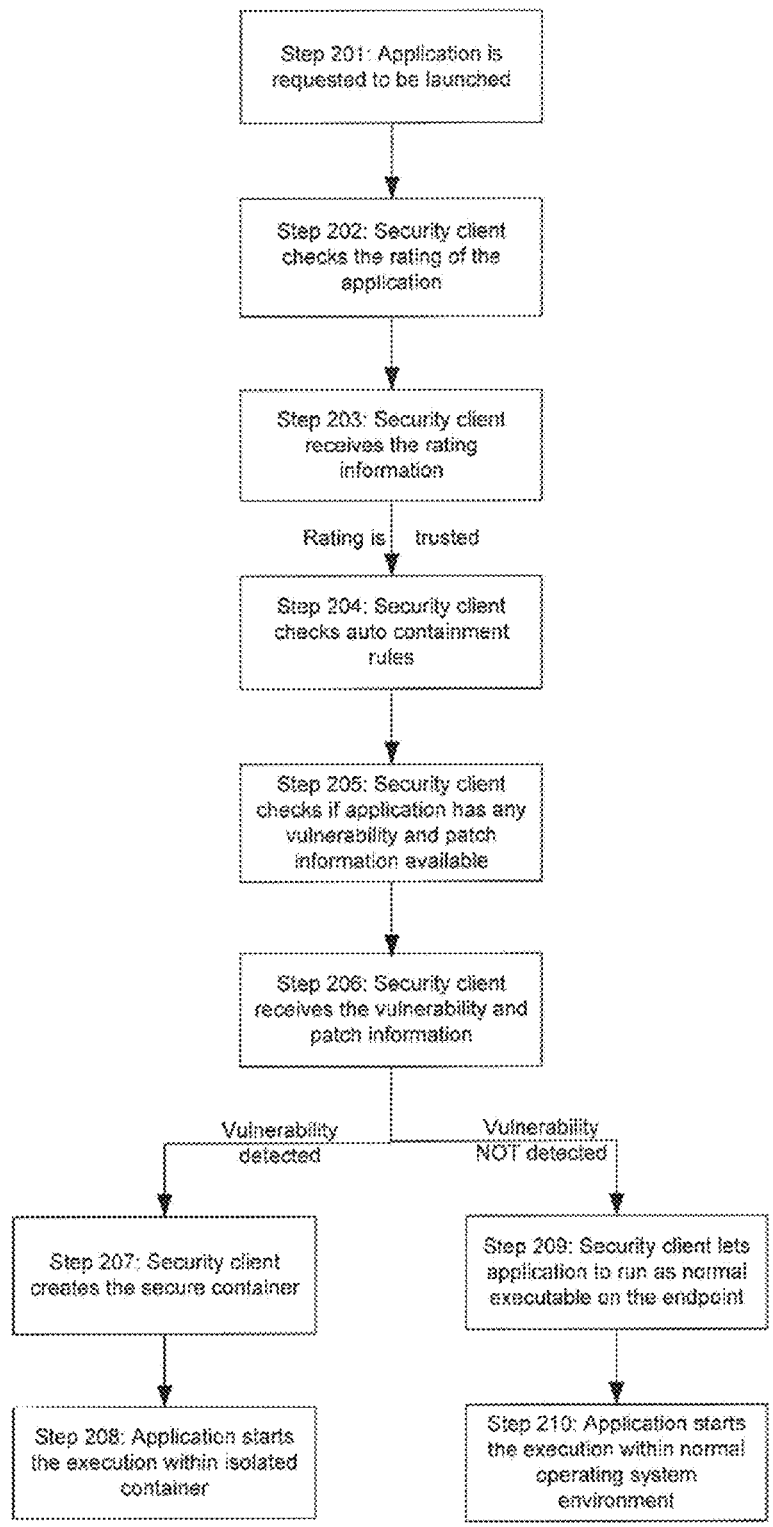
FIG. 2B is a flowchart presenting the process of the invention.

FIGS. 2A and 2B show the diagram and flowchart presenting the process of the invention. In step 201 application 40 is requested to be launched and triggers the security client 80. In step 202 security client 80 checks the rating of the application 40 (local or/and cloud intelligence sources 100). In step 203 security client 80 receives the rating information. In step 204 in case the rating is trusted security client 80 checks auto containment rules if the vulnerability and patch check is enabled, if enabled (default option). In step 205 security client 80 checks if the application 40 has any vulnerability and patch information available. In step 206 security client 80 receives the vulnerability and patch information. In step 207 if there is an available vulnerability or patch information, security client 80 creates the secure container 120 and provides the execution resources within new container or if there is an existing container, uses that one and provides the execution resources within existing container. In step 208 application 40 starts the execution within isolated container 120. In step 209 if there is no vulnerability or patch information, security client 80 lets application 40 to run as normal executable on the endpoint 60 with system default settings and access. In step 210 application 40 starts the execution within normal operating system environment.

Figure 3:
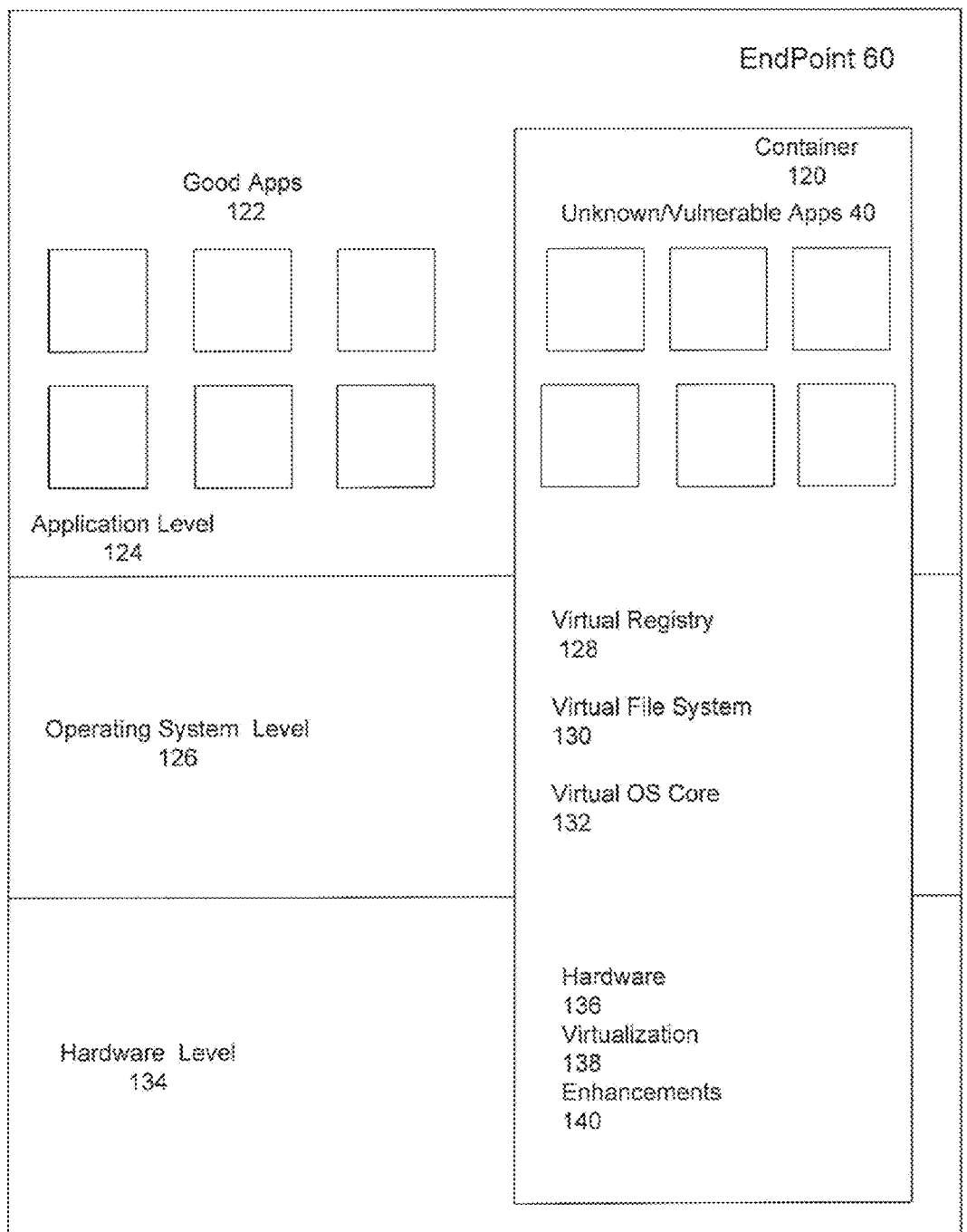
FIG. 3 is a diagram of invention where endpoint with secure container is presented.

FIG. 3 is a diagram of one embodiment of the invention where endpoint 60 with secure container 120 is presented. Application level 124 of secure container 120 comprises unknown/vulnerable applications 40. There would be implemented configuration options for end users 20 to turn off either one, or both of the following options. The first option is to enable/disable auto containment of known good applications 122 with known vulnerability. The second option is to enable/disable auto containment of known good applications 122 with potential vulnerability. Once the application 40 is patched against the known or potential vulnerabilities, it would not be contained but would be run with full access on the endpoint 60. Operating system level 126 of secure container 120 comprises virtual registry 128, virtual file system 130 and virtual OS core 132. Hardware level 134 of secure container 120 comprises hardware equipment 136, virtualization 138, and enhancements 140.

Particular examples include if a web browser is out of date (not up to date with security patches), then it is run in the containment aspect of the present invention. Similarly, any other application with security patch is included within the scope of the present invention, such as productivity applications (identified as Good Apps 122 on FIG. 3, and includes word processing, spreadsheets, power points, graphics etc., pdf readers converters, instant messaging applications), third party applications, security patch, or all patch requirements which are run inside container.

Figure 4:
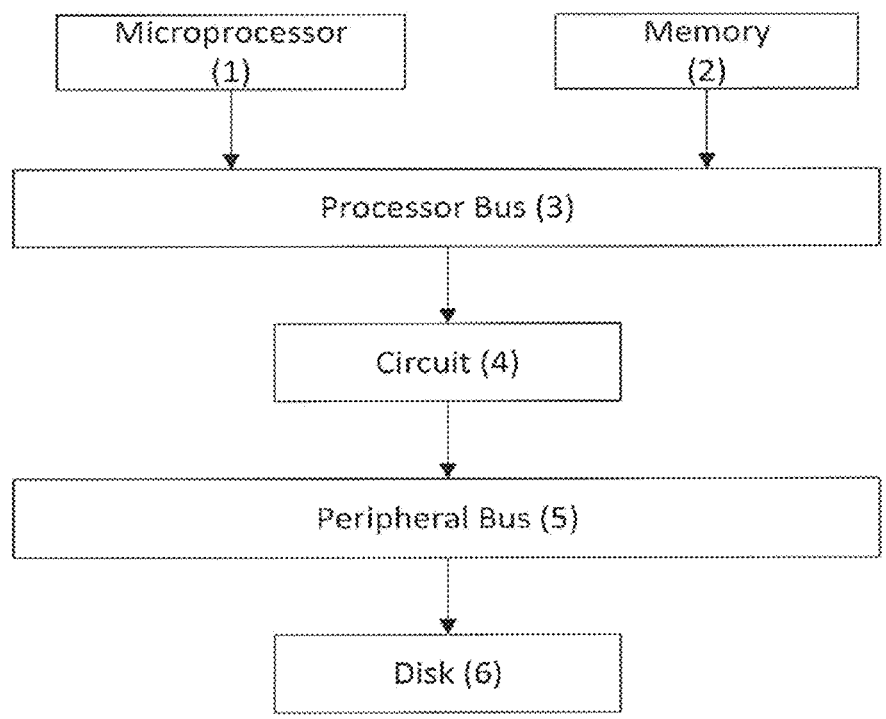
FIG. 4 is a schematic illustration of the connections of a computing system.
Figure 5:
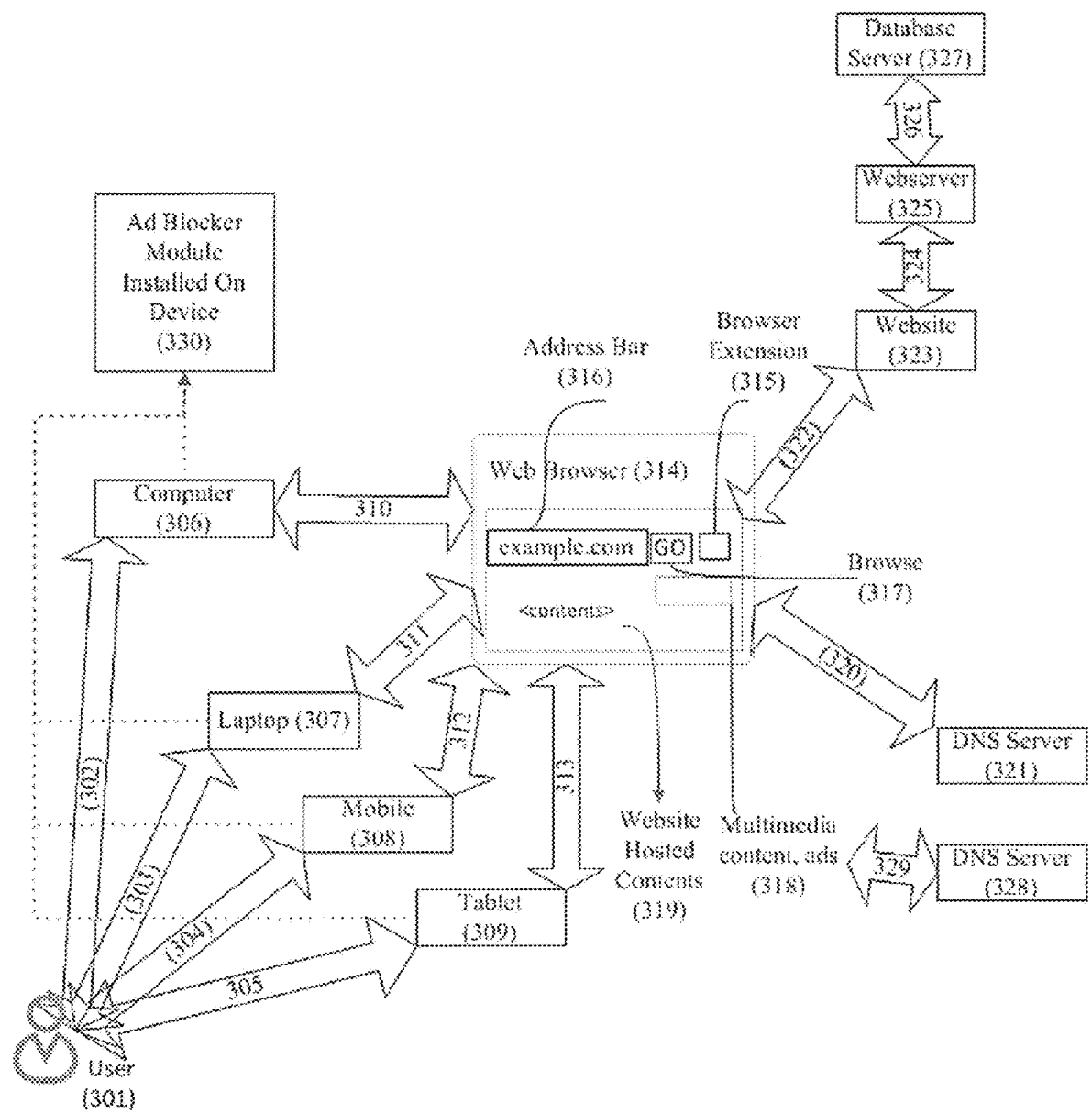
FIG. 5 is a schematic illustration showing how a user browses Internet and how different components act together to complete that browsing experience.
Figure 6:
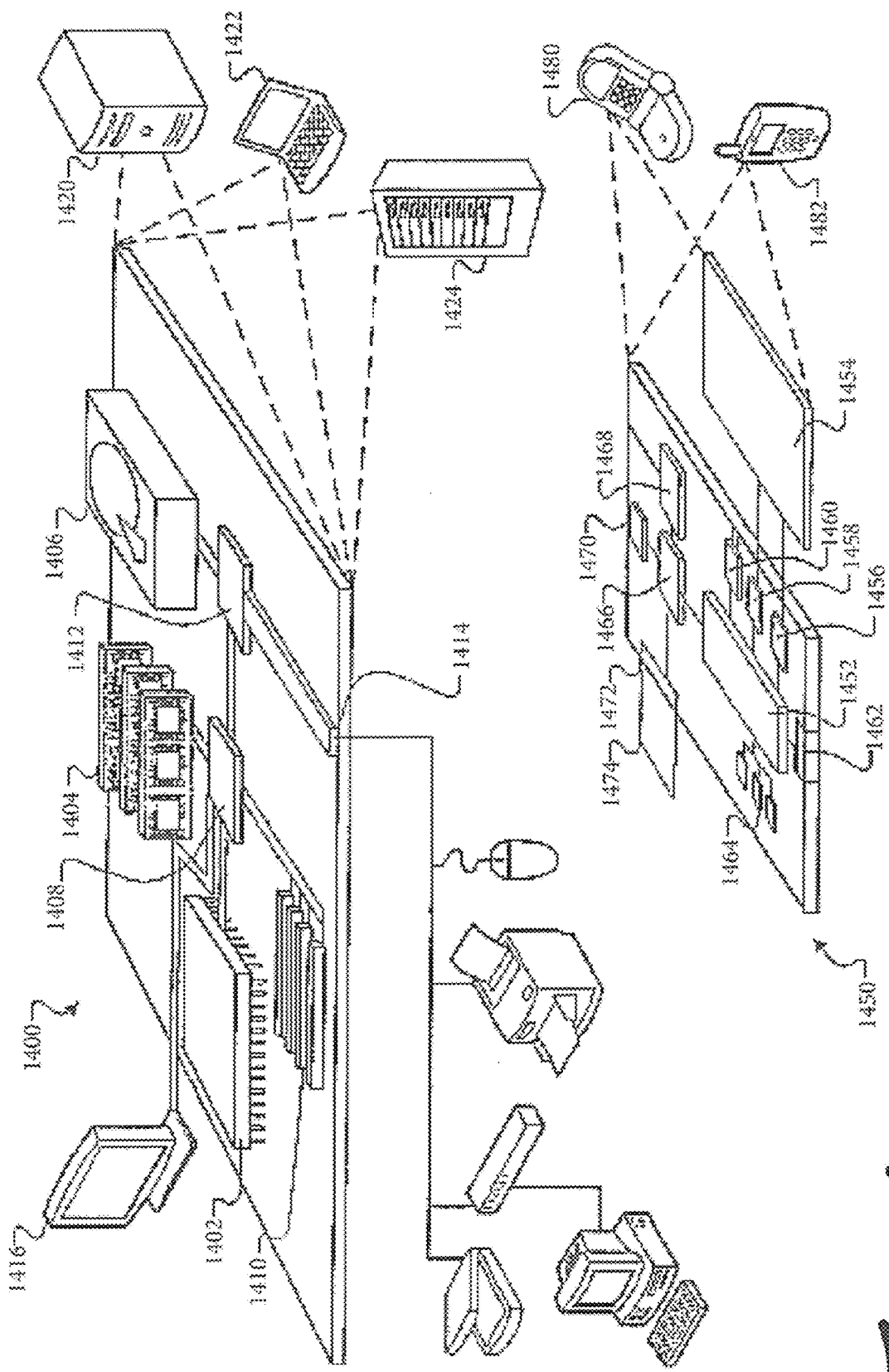
FIG. 6 is an illustration of a computer and mobile devices and their components.

The present invention is used with the following FIGS. 4, 5, and 6 of computer systems, components, and internet access. FIG. 4 illustrates a system of a computer or device which includes a microprocessor 1 and a memory 2 which are coupled to a processor bus 3 which is coupled to a peripheral bus 5 by circuitry 4. The bus 5 is communicatively coupled to a disk 6. It should be understood that any number of additional peripheral devices are communicatively coupled to the peripheral bus 5 in embodiments of the invention. Further, the processor bus 3, the circuitry 4 and the peripheral bus 5 compose a bus system for computing system 10 in various embodiments of the invention. The microprocessor 1 starts disk access commands to access the disk 6. Commands are passed through the processor bus 3 via the circuitry 4 to the peripheral bus 5 which initiates the disk access commands to the disk 6. In various embodiments of the invention, the present system intercepts the disk access commands which are to be passed to the hard disk.

FIG. 5 is a description of how communication works when the web is browsed and shows that a user (301) can use (302), (303), (304), (305) a computer (306), laptop (307), mobile (308) or a tablet (309) to launch (310), (311), (312), (313) a web browser (314) installed on that specific device to browse a specific website (323). The user can enter an address of some chosen web site on the address bar (316) and press a browser specific option to indicate to the browser to browse, as shown in FIG. 5 via button "Go" (317). After a user presses a browser specific option to navigate to a given web page as shown in FIG. 5 via button Go (317), web browser (314) first connects (320) to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect (326) to one or more database server(s) (327) to return specific user requested contents (319) back to web browser (314). Multimedia content and advertisements (318) are received from server 328 as shown by flow arrow 329.

In FIG. 5, browser extension (315) is shown to be installed in web browser that has capability to block any outgoing web request; and at the same time can block any html element present on web page using some pre-defined blacklist of outgoing URLs. At the same time a device may also be using one or other ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus depending on device setup, a web request may be blocked at browser level via ad blocker installed as browser extension (315) or may be blocked at network level using software module installed on device at network level and acting as ad blocker (330).

FIG. 6 shows an example of a generic computer device 1400 and a generic mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition. Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed:

1. A method for providing additional security on endpoints comprising:
   checking a rating of an application to determine trust of said application by a security client before said application is launched at an endpoint to decide if said application has any known or potential vulnerability or patch information associated with said application for a specific duration for said application;

checking intelligence source for vulnerability or patch information by the security client;
creating a secure container by the security client in the event there are any vulnerabilities or patch information of said application and providing execution resources within said secure container; said secure container having an application level of said secure container include unknown/vulnerable applications;
said secure container providing an option to enable or disable auto containment of known good applications with said known vulnerability;
said secure container providing an option to enable or disable auto containment of known good applications with said potential vulnerability;
containing automatically said application; and
isolating, by the secure container, all resource usage of said application from remaining known secure applications and spending resource usage only on said application; and
running said application inside said secure container automatically.

2. The method according to claim 1, where said application is checked by the security client and launched in a secure container comprising:
launching an application and triggering the security client;
checking the rating of said application by the security client;
receiving the rating information by the security client;
checking auto containment rules by the security client if the rating is trusted;
checking, by the security client, if said application has any vulnerability and patch information available;
receiving, by the security client, the vulnerability and patch information;
creating the secure container by the security client if there is an available vulnerability or patch information;
running said application within isolated container; and
running said application as a normal executable on the endpoint with system default settings and access if there is no vulnerability or patch information.

3. The method according to claim 1, wherein said secure container further comprises:
running said application with full access on the endpoint after said endpoint is patched against the known or the potential vulnerability;
an operating system level of said secure container includes a virtual registry, a virtual file system and a virtual OS core; and
a hardware level of said secure container includes hardware equipment, virtualization, and enhancements.

* * * * *